(12) United States Patent
Huang et al.

(10) Patent No.: US 6,611,263 B1
(45) Date of Patent: Aug. 26, 2003

(54) CULLING METHOD AND MODULE FOR 3D GRAPHICS

(75) Inventors: Ta-Lun Huang, Hsin-chu (TW); Chung-Yen Lu, Taipei (TW)

(73) Assignee: Silicon Integrated Systems Corp., Hsin-chu (TW)

(*) Notice: Subject to any disclaimer, the term of this patent is extended or adjusted under 35 U.S.C. 154(b) by 496 days.

(21) Appl. No.: 09/662,324

(22) Filed: Sep. 14, 2000

(51) Int. Cl.[7] .............................................. G06T 15/40
(52) U.S. Cl. .................................................... 345/421
(58) Field of Search ................................ 345/426, 427, 345/421, 620

(56) References Cited

U.S. PATENT DOCUMENTS 5,757,321 A * 5/1998 Billyard .................... 345/426

* cited by examiner

Primary Examiner—Mark Zimmerman
Assistant Examiner—Lance W. Sealey
(74) Attorney, Agent, or Firm—Birch, Stewart, Kolasch & Birch, LLP

(57) ABSTRACT

A culling method and module is provided to generate a culling decision for efficient culling a back-face triangle of a 3D graphics. The culling module includes a comparison circuit and a culling decision circuit. The comparison circuit compares the coordinates of three vertices of each triangle and then outputs the comparison results to the culling decision circuit. The culling decision circuit then generates a decision result by looking up a predetermined lookup table according to the comparison results and a pre-determined coordinate orientation signal.

12 Claims, 7 Drawing Sheets

CULLING METHOD AND MODULE FOR 3D GRAPHICS

BACKGROUND OF THE INVENTION

A. Field of the Invention

The present invention relates to a culling method and module applied in a 3D graphics system, and more particularly to a culling method and module to speed up culling using a comparison circuit and a culling decision circuit or tables.

B. Description of the Related Art

Generally, there are at least four procedures in the 3D graphics system as shown in FIG. 1. The TnL (Transform and Lighting) Engine 11 receives the 3D-Coordinate Vertex Stream and then transforms it into 2D-Coordinate Vertex Stream. The Culling module 12 receives the 2D-Coordinate Vertex Stream inputs for eliminating the polygons that cannot be seen from a view point. The Setup Engine 13 prepares the 2D-Coordinate Vertex Stream after culling for the Render Engine 14 to load the 3D graphics.

Culling or backface elimination is an operation that compares the orientation of complete polygons with the view point or center of projection and removes those polygons that cannot be seen. If a polygon can not be seen by a viewer from a point of view, then the polygon does not have to be rendered. Thus, the performance of the render engine 14 can be improved by early removing or culling away the invisible portions with respect to a particular viewpoint because the loading of further graphics process has been substantially reduced.

On average, half of the polygons in a polyhedron are back-facing, that is, invisible. To simplify the operational analysis, a triangle is usually used. The test for visibility is straightforward and is carried out in screen space. We calculate the outward normal for a polygon and examine the sign of this vector in z-axis component. If a culling test is performed on a triangle, the sign of the determinant for the triangle must be examined. Thus, $$visibility := \begin{cases} D > 0, & \text{if vertices' order is counterclockwise} \\ D < 0, & \text{if vertices' order is clockwise;} \end{cases}$$

$$D = \begin{vmatrix} x_1 & y_1 \\ x_2 & y_2 \\ x_3 & y_3 \end{vmatrix} = (x_1 - x_2)(y_2 - y_3) - (x_2 - x_3)(y_1 - y_3);$$

where D is the determinant of the triangle; and Vertices's coodinates are $(x_1, y_1)$, $(x_2, y_2)$ and $(x_3, y_3)$.

In most cases, the culling test is to calculate the outward normal of a triangle and examine the sign of the determinant for the vertices coordinates of a triangle to differentiate the visible and invisible surface from a viewpoint of a viewer. Thus, when the value of the determinant N is positive and the coordinate orientation is counterclockwise or when the value of the determinant N is negative and coordinate orientation is clockwise, the triangle is visible. Otherwise, the triangle is invisible. Accordingly, the vertices coordinates are $(x_1,y_1),(x_2, y_2)$ and $(x_3,y_3)$. The determinant N after operation is equal to (x1−x3)(y2−y3)−(x2 −x3)(y1−y3) respectively. According to the determinant N, it needs two multiplication operations and five subtraction operations to complete the analysis of one triangle. For a cost-effective design of culling module, it is desirable to provide a culling module without using multipliers.

SUMMARY OF THE INVENTION

Accordingly, the object of the present invention is to provide a fast and cost-effective culling method and module, which does not need any multiplication or subtraction operations for finding the vertices coordinates of a triangle. The method of the invention includes the following steps: first, divide the screen space into nine grids according to the positions of the first vertex $V_1$ and the second vertex $V_2$, of a triangle. Continuously, perform a fast culling test for the triangle by examining which grid the third vertex $V_3$ of a triangle is falling on. According to the relative positions of $V_1$, $V_2$ and the grid where the $V_3$ is falling in, a SIGN vector and a corresponding culling decision is obtained by looking up a culling decision table. The culling decision table records all the possible combinations of SIGN vectors, corresponding culling decisions and associated coordinate orientations. Culling a triangle may be quickly determined according to the SIGN vector and the corresponding culling decision of a culling decision table. Furthermore, the advantage of the present invention is that it is simple and easy to be implemented by using only a simple comparison circuit and a culling decision table for the culling test. Since the invention does not use multipliers, so the cost can be further reduced. Moreover, since the culling decision table is small, so the speed of table looking up is obviously faster than the computation speed of the conventional culling test.

BRIEF DESCRIPTION OF THE DRAWINGS

These and other objects and advantages of the present invention will become apparent by reference to the following description and accompanying drawings wherein.

Table 1 shows the vertex region table of a triangle according to a preferred embodiment of the present invention.

Table 2 shows a culling decision table of a triangle for counterclockwise direction according to a preferred embodiment of the present invention.

Table 3 shows a culling decision table of a triangle for clockwise direction according to a preferred embodiment of the present invention.

Table 4 shows a strict culling decision table of a triangle for counterclockwise direction according to a preferred embodiment of the present invention.

Table 5 shows a strict culling decision table of a triangle for clockwise direction according to a preferred embodiment of the present invention.

Table 6 shows a culling decision truth table according to a preferred embodiment of the present invention.

DETAIL DESCRIPTION OF THE INVENTION

The present invention provided a relative faster culling method and module to cull an invisible polygon, especially a triangle. Hereinafter, the culling method of the invention is described with reference to the accompanying figures.

Figure 3:
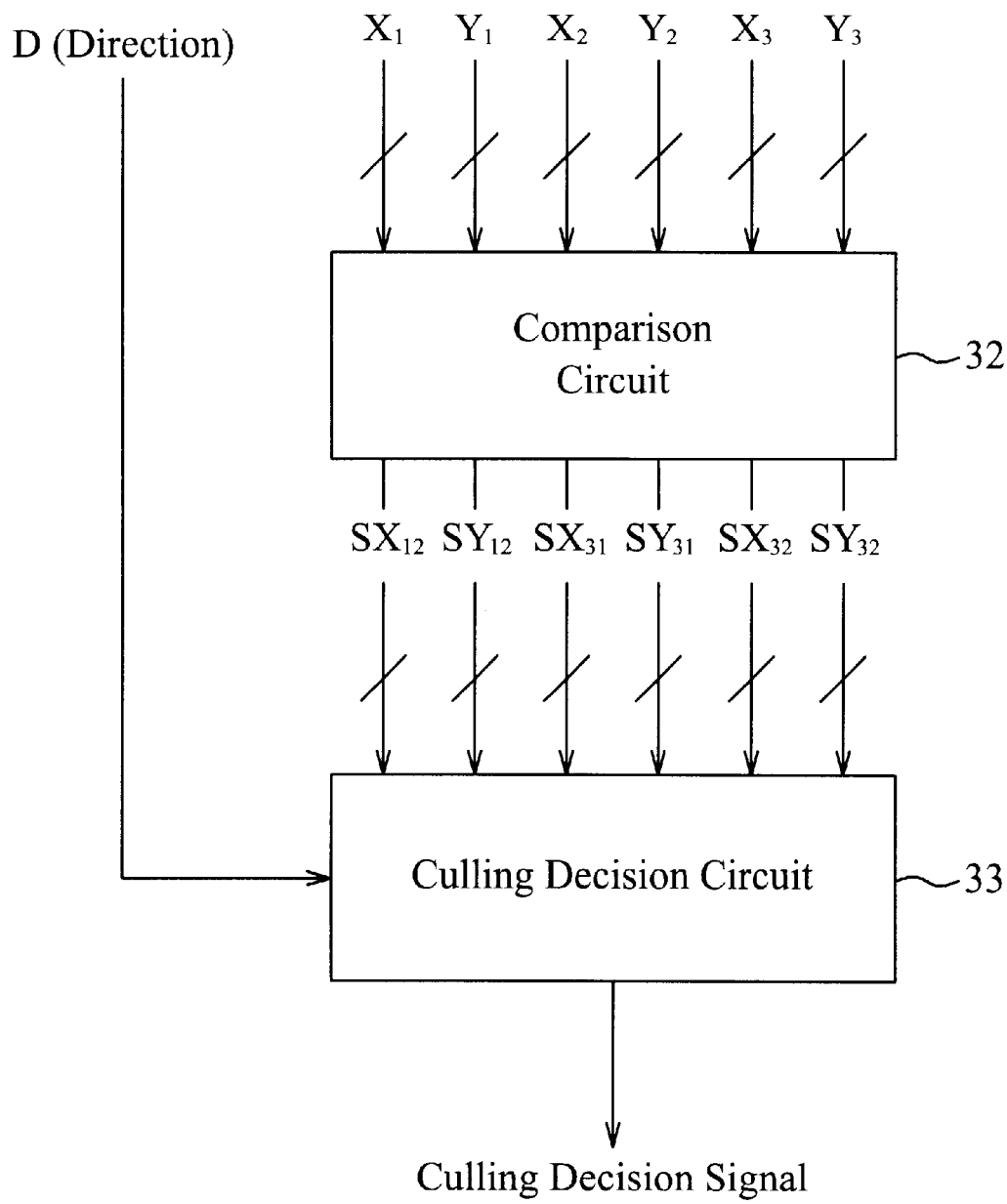
FIG. 3 is a simplified block diagram showing a culling module according to the first preferred embodiment of the present invention.

FIG. 3 is a simplified block diagram showing a culling module 31 according to the preferred embodiment of the invention. The culling module 31 includes a comparison circuit 32 and a culling decision circuit 33. The comparison circuit 32 receives 2D coordinates of triangle's vertices from 2D coordinate vertex stream and commutative compares the coordinates, and outputs the comparison results to the culling decision circuit 33. The culling decision circuit 33 is for generating a culling decision signal for an invisible triangle in response to the comparison results of the comparison circuit 32, and the coordinate orientation signal D.

Figure 4:
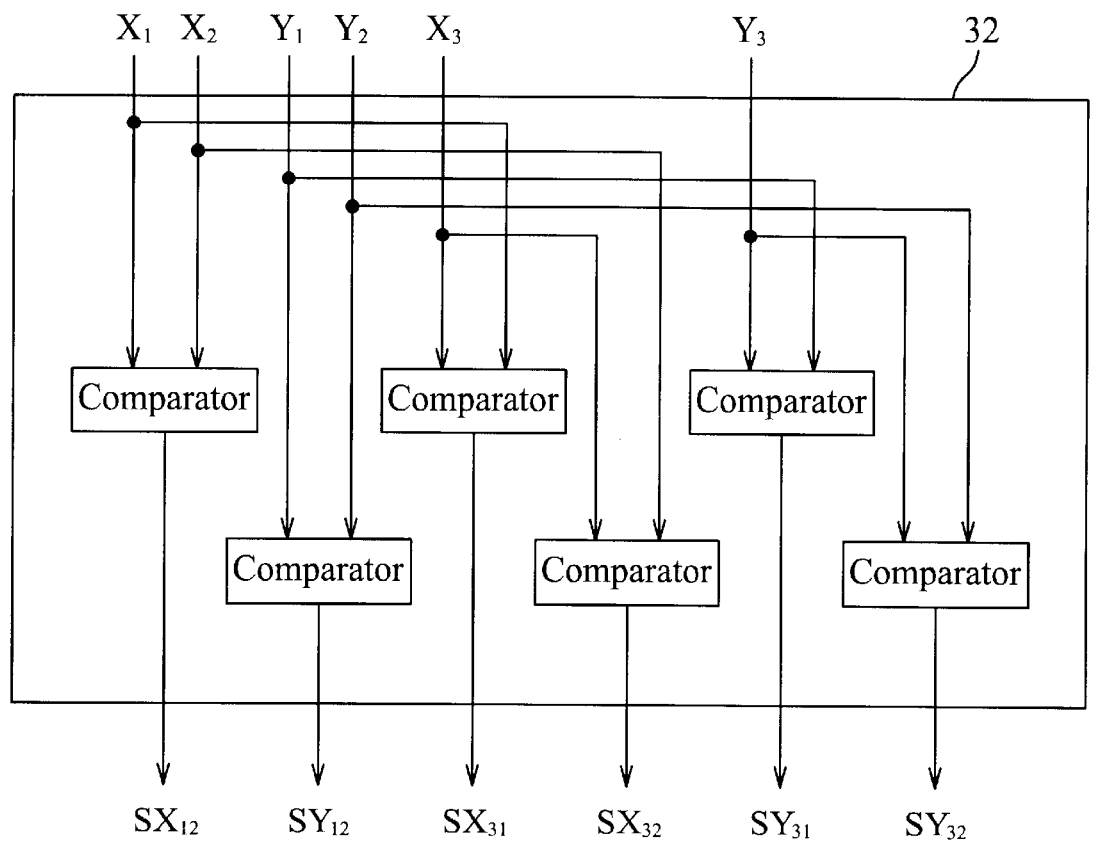
FIG. 4 is a schematic diagram showing the structure of the comparison circuit as shown in FIG. 3.

An exemplary comparison circuit 32 is shown in FIG. 4. There are at least six inputs and six outputs for the comparison circuit 32. The six inputs are a bit-stream of $x_1$, $y_1$, $x_2$, $y_2$, $x_3$ and $y_3$ which are the coordinates of three vertices $V_1(x_1,y_1)$, $V_2(x_2,y_2)$ and $V_3(x_3,y_3)$ of a triangle. The six outputs are $SX_{12}$, $SY_{12}$, $SX_{31}$, $SY_{31}$, $SX_{32}$ and $SY_{32}$ which together form a SIGN vector bit-stream. The general form $SX_{ij}$ and $SY_{ij}$ are used to depict the six outputs. The $SX_{ij}$ represents the comparison results of $x_i$ and $x_j$. $SY_{ij}$ represents the comparison result of $y_i$ and $y_j$. If the value of $x_i$ is larger than or equal to $x_j$, $SX_{ij}$ is set to 0 or false; otherwise $SX_{ij}$ set to 1 or true, so is $SY_{ij}$. The six comparison results together are output to the culling decision circuit 33. The culling decision circuit 33 generates a decision signal in response to the six comparison results or SIGN vector bit-stream, a coordinate direction signal D and built-in culling decision tables. Accordingly, the culling module 31 can perform fast culling according to the decision signal.

Figure 1:
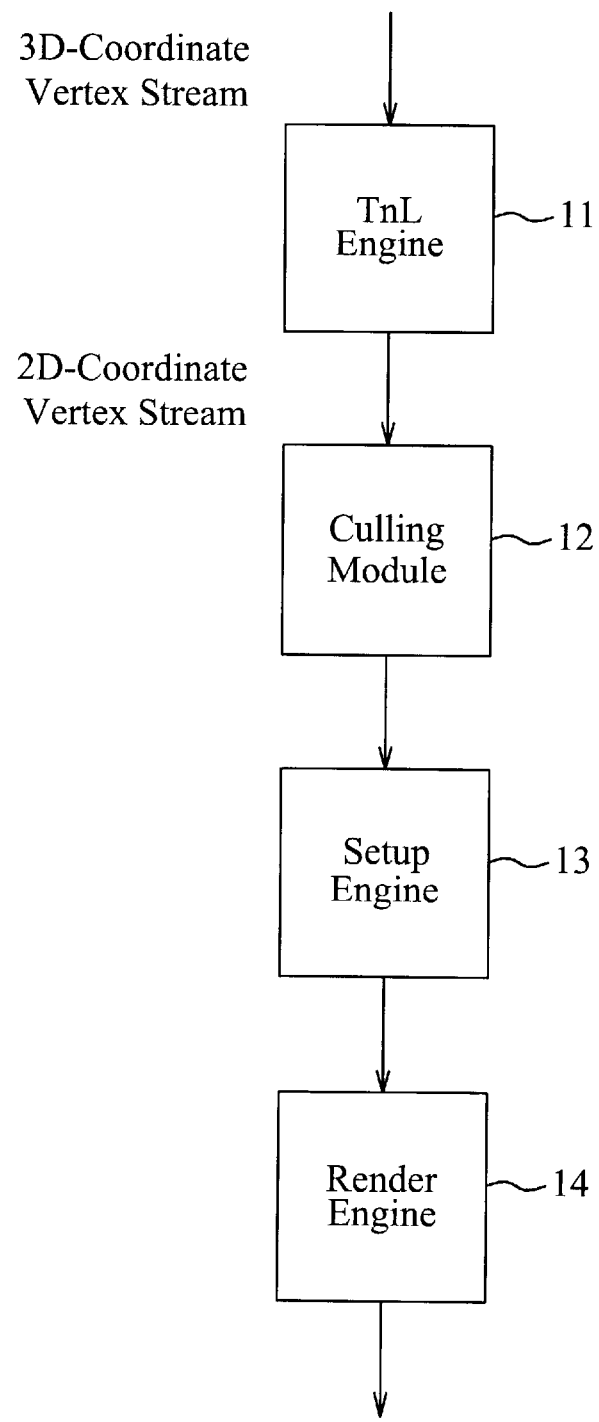
FIG. 1 is a simplified block diagram showing a conventional 3D graphics system.
Figure 2:
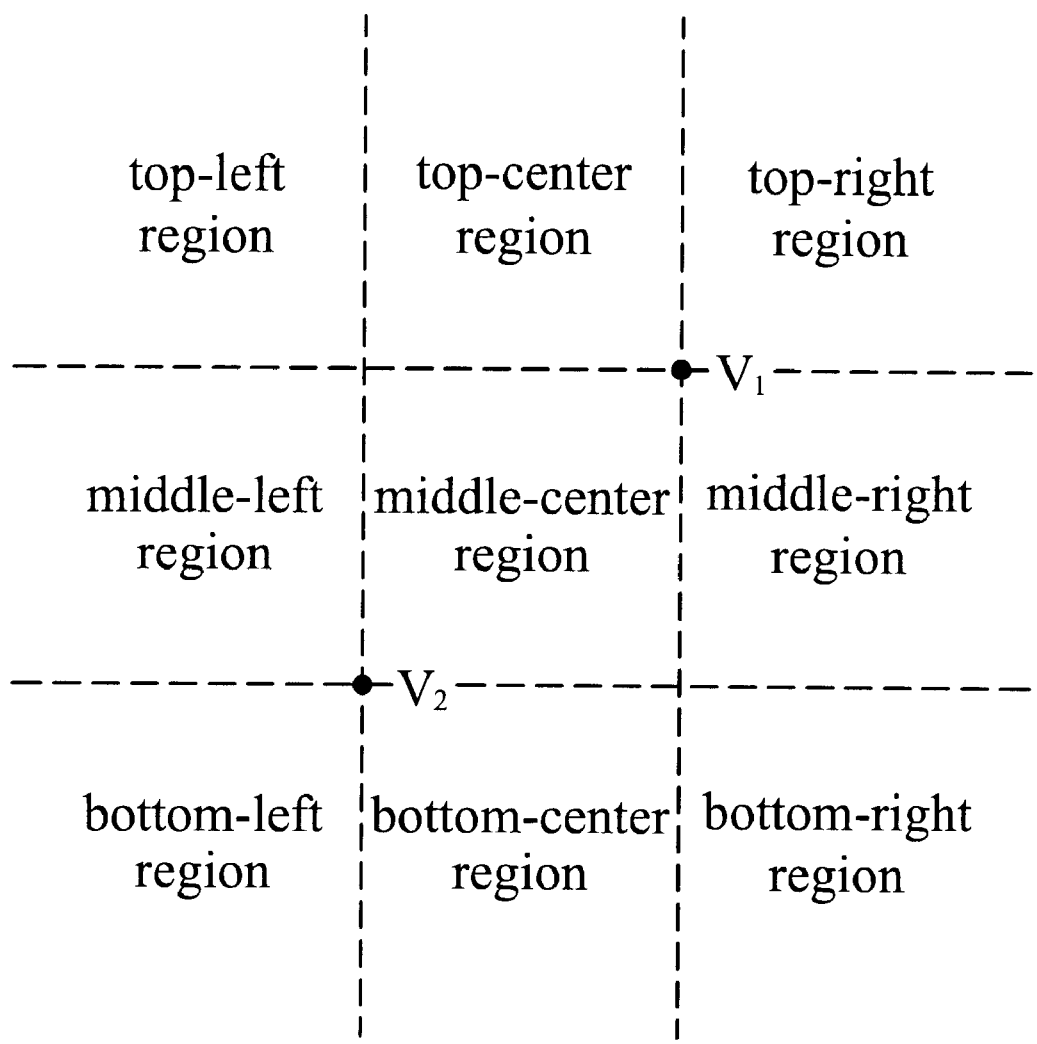
FIG. 2 is a schematic diagram showing nine grids on a screen space defined by the coordinates of the first vertex $V_1$ and the second vertex $V_2$ of a triangle according to the preferred embodiment of the present invention.

The built-in culling decision tables are built according to the grids of the screen space defined by the invention as illustrated in FIG. 2. The first vertex V1 (x1,y1) and the second vertex V2 (x2,y2) of the triangle form a box region on a screen space. Each box region is defined as follows:

$$\min(x_1,x_2) \leq x \leq \max(x_1,x_2);$$

$$\min(y_1,y_2) \leq y \leq \max(y_1,y_2).$$

The grids are dynamically defined on a screen space based on the coordinates of a first vertex V1 and a second vertex V2 of a triangle as illustrated in FIG. 2. The grids are defined as having top-left region, top-center region, top-right region, middle-left region, middle-center region, middle-right region, bottom-left region, bottom-center region and bottom-right region respectively. Based on the relative positions of $V_1$ and $V_2$, the right-handed direction (counterclockwise) or left-handed direction (clockwise) of the coordinate system and the grid where $V_3$ is fallen on, a culling decision for the triangle can be quickly determined by looking up the built-in tables.

Table 1 is a vertex region table for showing the SIGN vectors and associated regions. According to the comparison results of comparison circuit, the location of the third vertex $V_3$ can be determined by looking up Table 1. There are two fields in the vertex region table, SIGN vector and REGION field. The SIGN vector field consists of bit-stream ($SX_{12}$, $SY_{12}$, $SX_{31}$, $SX_{32}$, $SY_{31}$, $SY_{32}$) and the bit order of bit-stream is exchangeable. The bits of $SX_{ij}$ is generated by comparing $x_i$ with $x_j$ and the bits of $SY_i$ by comparing $y_i$ with $y_j$. The bits of $x_i$, $x_j$, $y_i$ and $y_j$, are formed by the coordinates of triangle vertices. If the value of $x_i$ is larger than or equal to $x_j$, $SX_{ij}$ is set to 0 or false; otherwise $SX_{ij}$ is set to 1 or true, so is $SY_{ij}$. The REGION field indicates which region of the grids the vertice $V_3$ is falling in. Note that there are several "Forbidden" indications in REGION field, which means that the respective values in SIGN vector field are not allowed.

Embodiment 1

Figure 5:
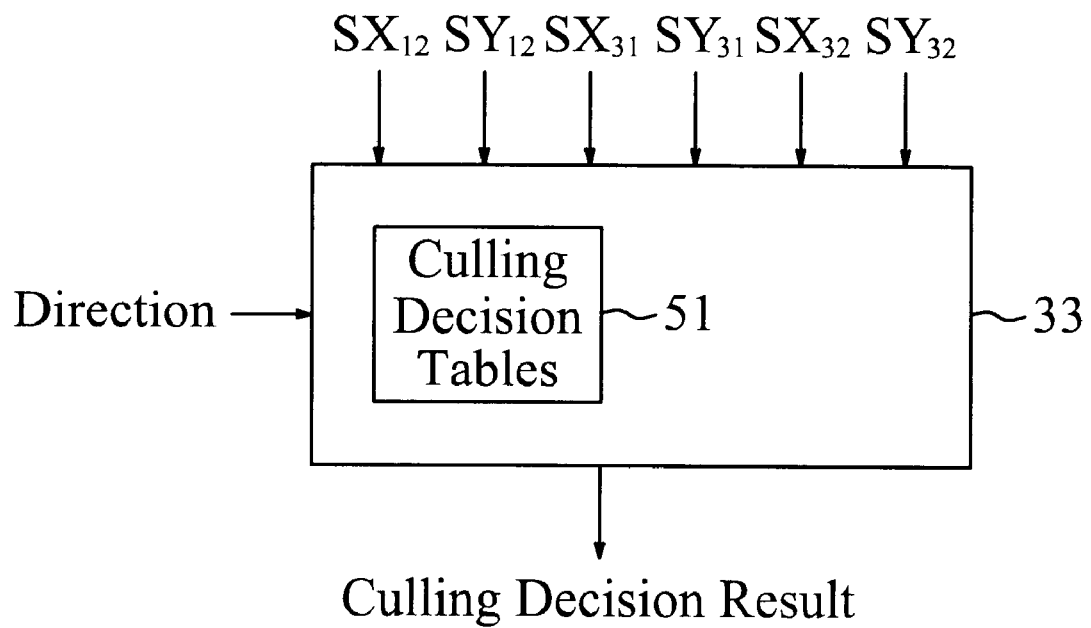
FIG. 5 is a schematic diagram showing the culling decision circuit using table look-up technology according to the embodiment of the present invention.

One implementation for culling a 3D graphics according to the present invention is explained in detail as below. A triangle has three vertices which are represented by $V_1(x_1, y_1)$, $V_2(x_2,y_2)$ and $V_3(x_3,y_3)$ respectively. In FIG. 5, those six coordinates of $x_1,y_1$, $x_2,y_2$, $x_3$ and $y_3$ are input to the comparison circuit 31 (Refer to FIG. 3). If the value of $x_i$ is larger than or equal to $x_j$, $SX_{ij}$ is set to 0 or false; otherwise $SX_{ij}$ is set to 1 or true, so is $SY_{ij}$. The comparison results $SX_{ij}$ and $SY_{ij}$ are used as indices for looking up culling decision tables 51 built-in the culling decision circuit 33. The culling decision circuit 33 can also be implemented by combinational logic which is formed according to Table 2 and Table 3. When the six comparison results and direction signal D of the coordinate orientation are input to the decision circuit, a culling decision can be quickly determined. Table 2 and Table 3 show the Culling decision tables for counterclockwise and clockwise directions with respect to a predetermined vertex. The SIGN vector implies bit-stream of ($SX_{12}$, $SY_{12}$, $SX_{31}$, $SX_{32}$, $SY_{31}$, $SY_{32}$) and the REGION field implies the corresponding culling decision. The bit order of a bit-stream is exchangeable.

In the culling decision tables, if the REGION field indicates True, then the associated triangle shall be culled. On the contrary, if the REGION field indicates False, then the associated triangle shall be put to the setup engine 13 for subsequent graphics processes. Note that there are don't care fields in the table 2 and table 3, which indicate that the SIGN vector or comparison results of vertices coordinate are insignificant.

Figure 6:
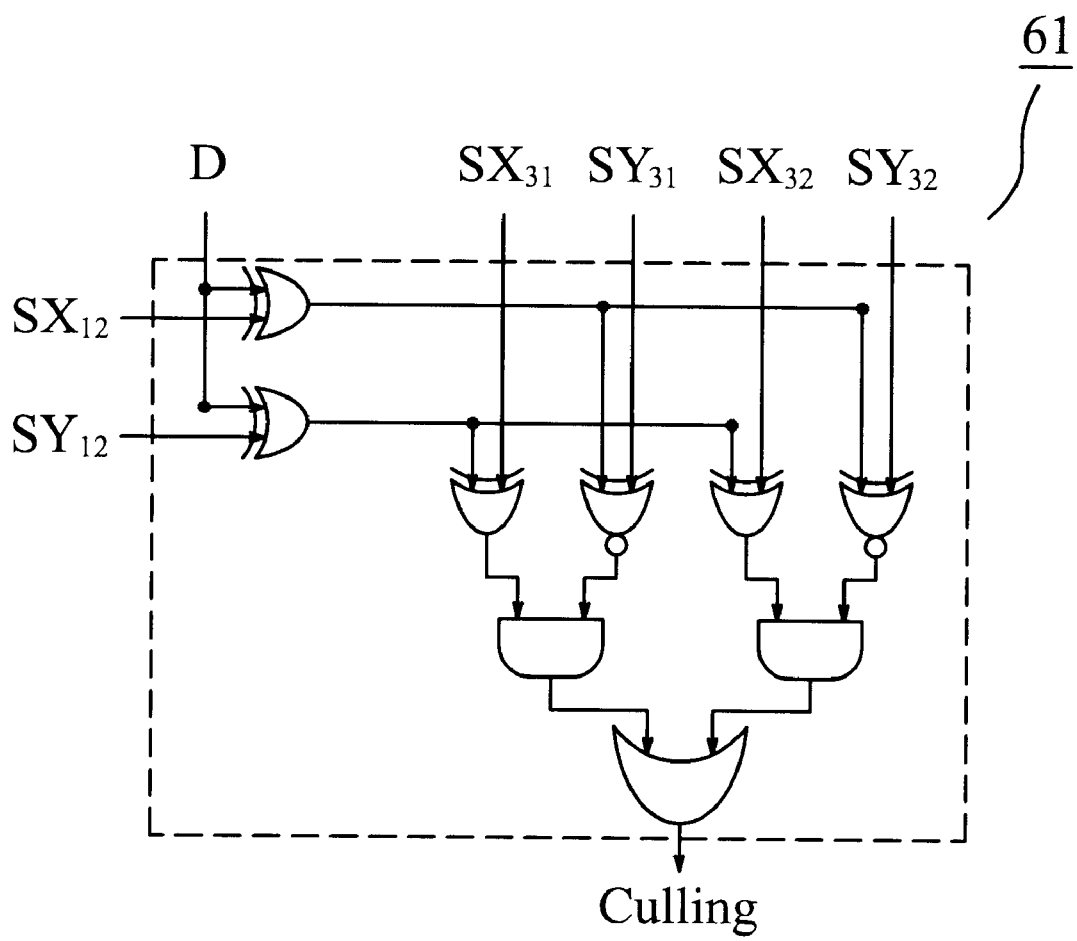
FIG. 6 is a schematic diagram showing the culling decision circuit using combinational logic according to the embodiment of the present invention.

An exemplary culling decision circuit 61 is depicted in FIG. 6. The combinational logic is derived from TABLE 2 and TABLE 3. The combination logic is as followed, Culling=$DSX_{12}SY_{12}(SX_{31}SY_{31}+SX_{32}SY_{32})+$
$DSX_{12}SY_{12}(SX_{31}SY_{31}+SX_{32}SY_{32})+DSX_{12}SY_{12}(SX_{31}SY_{31}+$
$SX_{32}SY_{32})+DSX_{12}SY_{12}(SX_{31}SY_{31}+SX_{32}SY_{32})+$
$DSX_{12}SY_{12}(SX_{31}SY_{31}+SX_{32}SY_{32})+DSX_{12}SY_{12}(SX_{31}SY_{31}+$
$SX_{32}SY_{32})+DSX_{12}SY_{12}(SX_{31}SY_{31}+SX_{32}SY_{32})+$
$DSX_{12}SY_{12}(SX_{31}SY_{31}+SX_{32}SY_{32})$ Culling=$(D \oplus SX_{12} \ SY_{31})(D \oplus SY_{12} \oplus SX_{31})+(D \oplus SX_{12} \ SY_{32})(D \oplus SY_{12} \oplus SX_{32})$;

where D is the direction signal of coordinate orientation, $\oplus$ means an exclusive-or operation and $\oplus$ means an exclusive-nor operation.

There are seven inputs and one output for the culling decision circuit 61, wherein the direction D indicates that the orientation of the coordinate system is counterclockwise or clockwise. If the direction is active, the coordinate system is for counterclockwise or right-handed direction. While the direction is inactive, the coordinate system is for clockwise or left-handed direction.

The advantage of the first embodiment is that only a simple comparison circuit and a culling decision circuit is implemented for the culling test.

Embodiment 2

A second embodiment of the present invention is explained in detail as below. A culling table is employed.

The definition of SIGN vector and DECISION field is the same with that of the first embodiment. On the other hand, a read only memory (ROM) is used in decision circuit for table look-up instead of combinational logic. A triangle consists of three vertices are $V_1(x_1,y_1)$, $V_2(x_2,y_2)$ and $V_3(x_3, y_3)$ respectively. In FIG. 6, those six coordinates of $x_1$, $y_1$, $x_2,y_2$, $x_3$ and $y_3$ are input to the comparison circuit 61 simultaneously. If the value of $x_1$ is larger than or equal to $x_j$, $SX_{ij}$ is set to 0 or false; otherwise $SX_{ij}$ is set to 1 or true, so is $SY_{ij}$. The comparison results of $SX_{ij}$ and $SY_{ij}$ are sent to the decision circuit 62. The decision circuit includes a ROM for storing the data of Table 4 and Table 5 for Table Look-Up to generate a culling decision. When the six comparison results of the comparison circuit and direction signal D are sent to the decision circuit, a culling decision can be determined by looking up the associated Culling Decision Tables as illustrated in Table 4 and Table 5.

The input field of tables 4 and 5 is SIGN vector, where the SIGN vector is a bit-stream ($SX_{12}$, $SY_{12}$, $SX_{31}$, $SX_{32}$, $SY_{31}$, $SY_{32}$) and the order of bit-stream is exchangeable. The output field of tables of 4 and 5 is REGION field, where the REGION field indicates a corresponding triangle should be culled or not. If the REGION field indicate True, then the triangle shall be culled. On the contrary, if the REGION field indicate False, then the triangle is put to the setup engine for subsequent graphics processes.

FIG. 6 illustrates a block diagram of the culling decision circuit using table look-up technique. The culling decision circuit 61 includes a read only memory (ROM) for storing culling decision tables. The seven input of the culling decision circuit 61 consists of six comparison results from the comparison circuit. Another input of the culling decision circuit 61 is Direction D which indicates that the coordinate system is counterclockwise or clockwise direction. If the Direction is active, the coordinate system is for counterclockwise or right-handed direction. While the Direction is active, the coordinate system is clockwise or left-handed direction.

The advantages of the second embodiment is that it requires only a simple comparison circuit and a ROM for storing Culling Decision tables.

Embodiment 3

Figure 7:
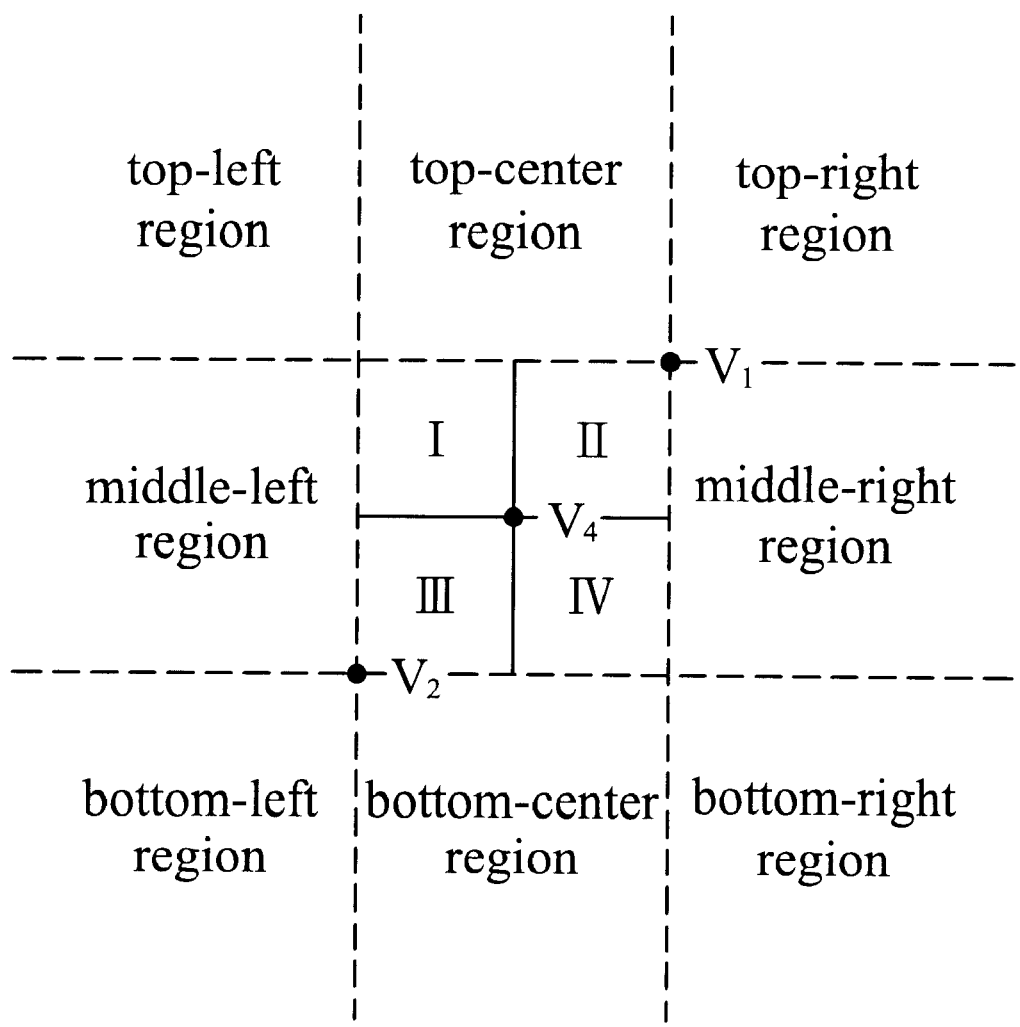
FIG. 7 is a schematic diagram showing four grids within the middle-Center region of the screen space according to another preferred embodiment of the present invention.

Based on the second embodiment, the middle-center region of the screen space can be further divided into four grids as illustrated in FIG. 7. In FIG. 7, the middle point of $V_1$ and $V_2$, is $V_4$ which divide the box region formed by $V_1$ and $V_2$ into four grids, namely I, II, III and IV respectively. When $V_3$ falls in the middle-center region, a precise culling test is executed by performing a further comparison to the location of $V_3$ and $V_4$. Table 6 shows the Culling decision truth table according to this embodiment.

The input field of SIGN vector bit-stream becomes (D, $SX_{12}$, $SY_{12}$, $SX_{31}$, $SX_{32}$, $SY_{31}$, $SY_{32}$, $SY_{34}$, $SY_{34}$) for two extra comparison bits have been added. The D indicates that the coordinate system is for counterclockwise or clockwise direction. The remaining structures and processes are the same as the first and the second embodiment.

It should be understood that various alternatives to the structures described herein may be employed in practicing the present invention. It is intended that the following claims define the invention and that the structure within the scope of these claims and their equivalents be covered thereby.

TABLE 1

| SIGN | REGION | SIGN | REGION | SIGN | REGION | SIGN | REGION |
|---|---|---|---|---|---|---|---|
| 000000 | Top-Right | 010000 | Top-Right | 100000 | Top-Right | 110000 | Top-Right |
| 000001 | Forbidden | 010001 | Middle Right | 100001 | Forbidden | 110001 | Middle Right |
| 000010 | Middle Right | 010010 | Forbidden | 100010 | Middle Right | 110010 | Forbidden |
| 000011 | Bottom Right | 010011 | Bottom Right | 100011 | Bottom Right | 110011 | Bottom Right |
| 000100 | Forbidden | 010100 | Forbidden | 100100 | Top-Center | 110100 | Top-Center |
| 000101 | Forbidden | 010101 | Forbidden | 100101 | Forbidden | 110101 | Middle-Center |
| 000110 | Forbidden | 010110 | Forbidden | 100110 | Middle-Center | 110110 | Forbidden |
| 000111 | Forbidden | 010111 | Forbidden | 100111 | Bottom-Center | 110111 | Bottom-Center |
| 001000 | Top-Center | 011000 | Top-Center | 101000 | Forbidden | 111000 | Forbidden |
| 001001 | Forbidden | 011001 | Forbidden | 101001 | Forbidden | 111001 | Forbidden |
| 001010 | Middle-Center | 011010 | Middle-Center | 101010 | Forbidden | 111010 | Forbidden |
| 001011 | Bottom-Center | 011011 | Bottom-Center | 101011 | Forbidden | 111011 | Forbidden |
| 001100 | Top-Left | 011100 | Top-Left | 101100 | Top-Left | 111100 | Top-Left |
| 001101 | Forbidden | 011101 | Middle-Left | 101101 | Forbidden | 111101 | Middle-Left |
| 001110 | Middle-Left | 011110 | Forbidden | 101110 | Middle-Left | 111110 | Forbidden |
| 001111 | Bottom-Left | 011111 | Bottom-Left | 101111 | Bottom-Left | 111111 | Bottom-Left |

TABLE 2

| SIGN | REGION | SIGN | REGION | SIGN | REGION | SIGN | REGION |
|---|---|---|---|---|---|---|---|
| 000000 | False | 010000 | True | 100000 | False | 110000 | False |
| 000001 | don't care | 010001 | True | 100001 | don't care | 110001 | True |
| 000010 | False | 010010 | don't care | 100010 | False | 110010 | don't care |
| 000011 | False | 010011 | False | 100011 | False | 110011 | True |
| 000100 | don't care | 010100 | don't care | 100100 | False | 110100 | False |
| 000101 | don't care | 010101 | don't care | 100101 | don't care | 110101 | False |
| 000110 | don't care | 010110 | don't care | 100110 | False | 110110 | don't care |
| 000111 | don't care | 010111 | don't care | 100111 | True | 110111 | True |
| 001000 | True | 011000 | True | 101000 | don't care | 111000 | don't care |
| 001001 | don't care | 011001 | False | 101001 | don't care | 111001 | don't care |

TABLE 2-continued

| SIGN | REGION | SIGN | REGION | SIGN | REGION | SIGN | REGION |
|---|---|---|---|---|---|---|---|
| 001010 | False | 011010 | don't care | 101010 | don't care | 111010 | don't care |
| 001011 | False | 011011 | False | 101011 | don't care | 111011 | don't care |
| 001100 | True | 011100 | False | 101100 | False | 111100 | False |
| 001101 | don't care | 011101 | False | 101101 | don't care | 111101 | False |
| 001110 | True | 011110 | don't care | 101110 | True | 111110 | don't care |
| 001111 | False | 011111 | False | 101111 | True | 111111 | False |

TABLE 3

| SIGN | REGION | SIGN | REGION | SIGN | REGION | SIGN | REGION |
|---|---|---|---|---|---|---|---|
| 000000 | False | 010000 | False | 100000 | True | 110000 | False |
| 000001 | don't care | 010001 | False | 100001 | don't care | 110001 | False |
| 000010 | True | 010010 | don't care | 100010 | True | 110010 | don't care |
| 000011 | True | 010011 | False | 100011 | False | 110011 | False |
| 000100 | don't care | 010100 | don't care | 100100 | True | 110100 | True |
| 000101 | don't care | 010101 | don't care | 100101 | don't care | 110101 | don't care |
| 000110 | don't care | 010110 | don't care | 100110 | False | 110110 | don't care |
| 000111 | don't care | 010111 | don't care | 100111 | False | 110111 | False |
| 001000 | False | 011000 | False | 101000 | don't care | 111000 | don't care |
| 001001 | don't care | 011001 | False | 101001 | don't care | 111001 | don't care |
| 001010 | False | 011010 | don't care | 101010 | don't care | 111010 | don't care |
| 001011 | True | 011011 | True | 101011 | don't care | 111011 | don't care |
| 001100 | False | 011100 | False | 101100 | False | 111100 | True |
| 001101 | don't care | 011101 | True | 101101 | don't care | 111101 | True |
| 001110 | False | 011110 | don't care | 101110 | False | 111110 | don't care |
| 001111 | False | 011111 | True | 101111 | False | 111111 | False |

TABLE 4

| SIGN | REGION | SIGN | REGION | SIGN | REGION | SIGN | REGION |
|---|---|---|---|---|---|---|---|
| 000000 | False | 010000 | True | 100000 | False | 110000 | False |
| 000001 | False | 010001 | True | 100001 | False | 110001 | True |
| 000010 | False | 010010 | False | 100010 | False | 110010 | False |
| 000011 | False | 010011 | False | 100011 | False | 110011 | True |
| 000100 | False | 010100 | False | 100100 | False | 110100 | False |
| 000101 | False | 010101 | False | 100101 | False | 110101 | False |
| 000110 | False | 010110 | False | 100110 | False | 110110 | False |
| 000111 | False | 010111 | False | 100111 | True | 110111 | True |
| 001000 | True | 011000 | True | 101000 | False | 111000 | False |
| 001001 | False | 011001 | False | 101001 | False | 111001 | False |
| 001010 | False | 011010 | False | 101010 | False | 111010 | False |
| 001011 | False | 011011 | False | 101011 | False | 111011 | False |
| 001100 | True | 011100 | False | 101100 | False | 111100 | False |
| 001101 | False | 011101 | False | 101101 | False | 111101 | False |
| 001110 | True | 011110 | False | 101110 | True | 111110 | False |
| 001111 | False | 011111 | False | 101111 | True | 111111 | False |

TABLE 5

| SIGN | REGION | SIGN | REGION | SIGN | REGION | SIGN | REGION |
|---|---|---|---|---|---|---|---|
| 000000 | False | 010000 | False | 100000 | True | 110000 | False |
| 000001 | False | 010001 | False | 100001 | False | 110001 | False |
| 000010 | True | 010010 | False | 100010 | True | 110010 | False |
| 000011 | True | 010011 | False | 100011 | False | 110011 | False |
| 000100 | False | 010100 | False | 100100 | True | 110100 | True |
| 000101 | False | 010101 | False | 100101 | False | 110101 | False |
| 000110 | False | 010110 | False | 100110 | False | 110110 | False |
| 000111 | False | 010111 | False | 100111 | False | 110111 | False |
| 001000 | False | 011000 | False | 101000 | False | 111000 | False |
| 001001 | False | 011001 | False | 101001 | False | 111001 | False |
| 001010 | False | 011010 | False | 101010 | False | 111010 | False |
| 001011 | True | 011011 | True | 101011 | False | 111011 | False |
| 001100 | False | 011100 | False | 101100 | False | 111100 | True |
| 001101 | False | 011101 | True | 101101 | False | 111101 | True |
| 001110 | False | 011110 | False | 101110 | False | 111110 | False |
| 001111 | False | 011111 | True | 101111 | False | 111111 | False |

TABLE 6

| SIGN | REGION | SIGN | REGION |
| --- | --- | --- | --- |
| 1001000xx | True | 0011101xx | True |
| 1001100xx | True | 0011111xx | True |
| 1001110xx | True | 0100000xx | True |
| 1010000xx | True | 0100010xx | True |
| 1010001xx | True | 0100100xx | True |
| 1011000xx | True | 0110100xx | True |
| 1100111xx | True | 0111100xx | True |
| 1101110xx | True | 0111101xx | True |
| 1101111xx | True | 111010101 | True |
| 1110001xx | True | 011010110 | True |
| 1110011xx | True | 100101010 | True |
| 1110111xx | True | 000101001 | True |
| 0000010xx | True | 110011000 | True |
| 0000011xx | True | 010011011 | True |
| 0001011xx | True | 101100111 | True |
| 0011011xx | True | 001100100 | True |

What is claimed is:

1. A culling method for 3D graphics, comprising the steps of:

establishing culling decision tables according to each combination of SIGN vector bit-streams of a polygon;

obtaining comparison results by comparing positions of each pair of vertices of said polygon;

generating a culling decision by looking up said culling decision tables in response to each of said comparison results; and culling said polygon in response to said culling decision.

2. The culling method as claimed in claim 1, wherein said step of establishing said culling decision tables comprises the steps of:

dynamically defining a plurality of grids on a screen space based on each vertex position of said polygon;

obtaining a SIGN vector by comparing each pair of vertex positions of said polygon;

determining a culling decision for each combination of said SIGN vector according to a sign of a visibility determinant; and recording each of said SIGN vector and associated culling decision.

3. The culling method as claimed in claim 1, wherein said polygon is a triangle.

4. The culling method as claimed in claim 3, wherein said plurality of grids are defined as having a top-left region, a top-center region, a top-right region, a middle-left region, a middle-center region, a middle-right region, a bottom-left region, a bottom-center region and a bottom-right region.

5. The culling method as claimed in claim 4, wherein said SIGN vector is a bit-stream of (SX12, SY12, SX31, SX32, SY31, SY32) and the bit order of said SIGN vector is exchangeable.

6. The culling method as claimed in claim 3, wherein said step of obtaining a SIGN vector comprises the steps of:

setting a position $SX_{12}$ of a vertex to false when a position of $x_1$ is larger than or equal to a position of $x_2$;

setting a position $SX_{12}$ of a vertex to true when a position of $x_1$ is smaller than a position of $x_2$;

setting a position $SY_{12}$ of a vertex to false when a position of $y_1$ is larger than or equal to a position of $y_2$;

setting a position $SY_{12}$ of a vertex to true when a position of $y_1$ is smaller than a position of $y_2$;

setting a position $SX_{31}$ of a vertex to false when a position of $x_3$ is larger than or equal to a position of $x_1$;

setting a position $SX_{31}$ of a vertex to true when a position of $x_3$ is smaller than a position of $x_1$;

setting a position $SY_{31}$ of a vertex to false when a position of $y_3$ is larger than or equal to a position of $y_1$;

setting a position $SY_{31}$ of a vertex to true when a position of $y_3$ is smaller than or equal to a position of $y_1$;

setting a position $SX_{32}$ of a vertex to false when a position of $x_3$ is larger than or equal to a position of $x_2$;

setting a position $SX_{32}$ of a vertex to true when a position of $x_3$ is smaller than a position of $x_2$;

setting a position of $SY_{32}$ to false when a position of $y_3$ is larger than or equal to a position of $y_2$; and setting a position of $SY_{32}$ to true when a position of $y_3$ is smaller than a position of $y_2$.

7. The method as claimed in claim 4, wherein said middle-center region is further divided into four grids.

8. The method as claimed in claim 7, further comprising the steps of:

obtaining two extra bits for said SIGN vector according to a comparison result of comparing a position of a third vertex $V_3$ with a middle point between a first vertex and a second vertex;

generating a new SIGN vector by adding said two extra bits to said SIGN vector; and generating a second culling decision for each new SIGN vector.

9. A culling module for 3D graphics, comprising:

comparison means for generating a bit-stream of a comparison result by comparing coordinates of a third vertex $V_3$ with a first vertex $V_1$ and a second vertex $V_2$, said coordinates of said first vertex $V_1$ with a second vertex $V_2$; and culling decision means for generating a culling decision in response to said bit-stream of said comparison result and a coordinate orientation signal.

10. The culling module as claimed in claim 9, wherein said comparison means is implemented by a plurality of comparators.

11. The culling module as claimed in claim 9, wherein said culling decision means is implemented by a Read Only Memory (ROM) for storing a plurality of culling decision tables.

12. The culling module as claimed in claim 11, wherein said culling decision tables include fields of a SIGN vector, a culling DECISION and a coordinate orientation.

* * * * *